United States Patent
Jang et al.

(10) Patent No.: US 12,397,665 B2
(45) Date of Patent: Aug. 26, 2025

(54) CHARGING SYSTEM FOR AN ELECTRIFIED VEHICLE

(71) Applicants: HYUNDAI MOTOR COMPANY, Seoul (KR); KIA CORPORATION, Seoul (KR)

(72) Inventors: Ho Sun Jang, Suwon-si (KR); Jin Wook Kang, Gunpo-si (KR); Seong Min Kim, Yongin-si (KR); Seung Hyeon Bin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 172 days.

(21) Appl. No.: 18/513,067

(22) Filed: Nov. 17, 2023

(65) Prior Publication Data
US 2025/0033498 A1 Jan. 30, 2025

(30) Foreign Application Priority Data
Jul. 24, 2023 (KR) .................. 10-2023-0096296

(51) Int. Cl.
| | |
|---|---|
| H02M 7/217 | (2006.01) |
| B60L 50/51 | (2019.01) |
| B60L 53/20 | (2019.01) |
| H02J 7/00 | (2006.01) |
| H02J 7/04 | (2006.01) |
| H02P 27/06 | (2006.01) |

(52) U.S. Cl.
CPC ............... *B60L 53/20* (2019.02); *B60L 50/51* (2019.02); *H02J 7/00309* (2020.01); *H02J 7/04* (2013.01); *H02P 27/06* (2013.01); *B60L 2210/14* (2013.01); *B60L 2210/42* (2013.01); *H02J 2207/20* (2020.01)

(58) Field of Classification Search
CPC ...... B60L 53/20; B60L 50/51; H02J 7/00309; H02J 7/04; H02J 2207/20; H02J 7/0029; H02J 7/0047; H02P 27/06
See application file for complete search history.

(56) References Cited

U.S. PATENT DOCUMENTS

| | | | |
|---|---|---|---|
| 2009/0033274 A1* | 2/2009 | Perisic | B60L 50/51 318/440 |
| 2010/0013438 A1* | 1/2010 | Anwar | B60L 53/64 180/65.29 |
| 2013/0147431 A1* | 6/2013 | Lim | H02J 7/02 320/109 |
| 2020/0361323 A1* | 11/2020 | Chon | H02M 7/44 |

* cited by examiner

*Primary Examiner* — Muhammad S Islam
(74) *Attorney, Agent, or Firm* — Lempia Summerfield Katz LLC

(57) ABSTRACT

A charging system for an electrified vehicle includes: a first switch unit selectively connected at one end thereof to first ends or to second ends of a plurality of coils included in a motor; a plurality of switches each connected at one end thereof to another end of the first switch unit while other ends of the plurality of switches are inter-shorted to form a neutral point of the motor; and a controller configured to control a switching state of the first switch unit.

18 Claims, 6 Drawing Sheets

CHARGING SYSTEM FOR AN ELECTRIFIED VEHICLE

CROSS-REFERENCE TO RELATED APPLICATION

This application claims the benefit of and priority to Korean Patent Application No. 10-2023-0096296 filed on Jul. 24, 2023 in the Korean Intellectual Property Office, the entire disclosure of which is incorporated herein by reference.

BACKGROUND

1. Field of the Disclosure

The present disclosure relates to a charging system for an electrified vehicle capable of achieving battery recharging even when one or more of inverters fail in a procedure of recharging a battery of the electrified vehicle using a motor and the inverters.

2. Description of the Related Art

In pace with recently increased interest in the environment, use of ecofriendly vehicles equipped with an electric motor as a driving source is increasing. Such an ecofriendly vehicle is also called an "electrified vehicle". As representative examples of electrified vehicles, there are electric vehicles (EV) and plug-in hybrid electric vehicles (PHEV).

Generally, an electric vehicle or a plug-in hybrid electric vehicle performs recharging of a battery therein by converting electric power supplied from an external recharging facility into a state suitable for battery recharging. Then the converted electric power is supplied to the battery.

Conventional recharging facilities for fast recharging are manufactured to output a single standard voltage of 500 V. However, the recent tendency of batteries used in vehicles is to be designed to have a voltage of 800 V or more to enhance efficiency and increase driving range.

Meanwhile, some fast recharging facilities have a voltage standard of 1,000V and, as such, such fast recharging facilities may recharge a battery of 800V after dropping a voltage thereof to a voltage suitable for the battery. On the other hand, when a 800V battery is recharged using an external recharging facility having a voltage standard of 500V, a boost converter is required to boost a voltage supplied from the recharging facility.

In an electrified vehicle equipped with a motor and an inverter, a coil of the motor and a power conversion switch of the inverter may be used as a boost converter to boost the supplied voltage.

The above subject matter disclosed in this section is merely to enhance understanding of the general background of the disclosure. The above should not be taken as an acknowledgement or any form of suggestion that the subject matter forms the related art already known to a person of ordinary skill in the art.

SUMMARY

Therefore, the present disclosure has been made in view of the above problems. It is an object of the present disclosure to provide a charging system of an electrified vehicle capable of continuously performing recharging through another inverter, even when an inverter performing a boost converter function fails during recharging of a battery of the electrified vehicle.

Objects of the present disclosure are not limited to the above-described objects. Other objects of the present disclosure not yet described should be more clearly understood by those of ordinary skill in the art from the following detailed description.

In accordance with an aspect of the present disclosure, the above and other objects can be accomplished by the provision of a charging system of an electrified vehicle. The charging system includes a battery configured to receive or output DC electric power and a motor having a plurality of coils respectively corresponding to a plurality of phases. The charging system includes a first inverter having first AC terminals respectively connected to first ends of the plurality of coils and having first DC terminals connected to the battery. The charging system includes a second inverter having second AC terminals respectively connected to second ends of the plurality of coils and having second DC terminals connected to the battery. The charging system includes a first switch unit selectively connected at one end thereof to the first ends or the second ends of the plurality of coils. The charging system includes a plurality of switches each having one end connected to another end of the first switch unit and each having another end that is inter-shorted to form a neutral point of the motor. The charging system includes a controller configured to control a switching state of the first switch unit.

The controller may control the switching state of the first switch unit based on a state of the first inverter when the battery is recharged with external electric power input through the neutral point.

When the first inverter is in a normal state, the controller may control the switching state of the first switch unit such that the one end of the first switch unit is connected to the second ends of the plurality of coils.

When the first inverter is in a failed state, the controller may control the switching state of the first switch unit such that the one end of the first switch unit is connected to the first ends of the plurality of coils.

The failed state of the first inverter may include at least one of an abnormality of a current sensing value of the first inverter or an excessive temperature of the first inverter.

The abnormality of the current sensing value of the first inverter may be determined based on a current of each of the first AC terminals and a battery input current.

When the first inverter is in a failed state, the controller may control the switching state of the first switch unit after stopping driving of the first inverter.

When the first inverter is in a failed state, the controller may control the switching state of the first switch unit after starting driving of the second inverter.

The controller may control recharging of the battery based on a state of the second inverter under a condition that the one end of the first switch unit is connected to the first ends the plurality of coils.

When the second inverter is in a failed state, the controller may end recharging of the battery.

The charging system may further include a second switch unit having one end that is connected to an input terminal for external electric power for recharging of the battery and having another end that is selectively connected to the battery or the other ends of the plurality of switches.

When the other end of the second switch unit is connected to the other ends of the plurality of switches, the controller may control the switching state of the first switch unit based on a state of the first inverter.

The controller may control a switching state of the second switch unit based on a voltage command for the external electric power.

The controller may control the switching state of the second switch unit based on whether or not a voltage value according to the voltage command exceeds a predetermined voltage value that is set based on a voltage specification of the battery.

When the voltage value according to the voltage command exceeds the predetermined voltage value, the controller may control the switching state of the second switch unit such that the other end of the second switch unit is connected to the other ends of the plurality of switches.

When the voltage value according to the voltage command does not exceed the predetermined voltage value, the controller may control the switching state of the second switch unit such that the other end of the second switch unit is connected to the battery.

The controller may output information corresponding to a state of at least one of the first inverter or the second inverter.

The charging system may further include a display unit configured to represent the output information in at least one of a visual manner or an audible manner.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION OF EMBODIMENTS

Figure 1:
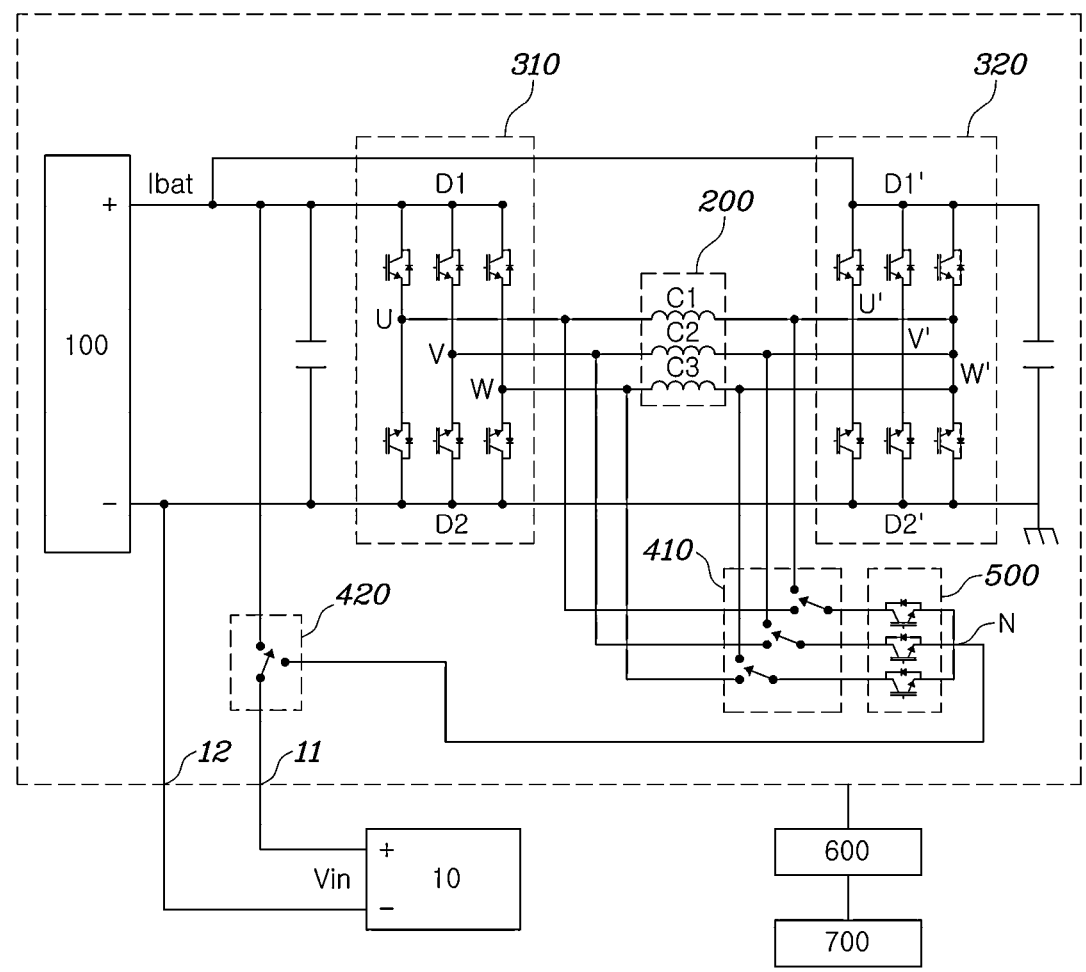
FIG. 1 is a circuit diagram of the charging system according to an embodiment of the present disclosure.

For embodiments of the present disclosure described herein, specific structural or functional descriptions are examples to merely describe the embodiments of the present disclosure. The embodiments of the present disclosure can be implemented in various forms and should not be interpreted as being limited to the specifics of the embodiments described in the present specification.

Embodiments may be variously modified and may have various forms. In connection with this, specific embodiments are illustrated in the drawings and are described in detail in the specification, but the present disclosure should not be construed as limited to the specific embodiments. It is to be appreciated that all changes, equivalents, and substitutes that do not depart from the spirit and technical scope of the present disclosure are encompassed in the embodiments.

Unless defined otherwise, terms used herein including technological or scientific terms have the same meaning as generally understood by those of ordinary skill in the art to which the disclosure pertains. The terms used herein shall be interpreted not only based on the definition of any dictionary but also the meaning that is used in the field to which the disclosure pertains. In addition, unless clearly defined, the terms used herein shall not be interpreted too ideally or formally.

Hereinafter, embodiments of the present disclosure are described in detail with reference to the accompanying drawings. The same or similar elements are designated by the same reference numerals throughout the drawings and redundant description thereof has been omitted.

In the following description of embodiments, the term "predetermined" means that, when a parameter is used in a process or an algorithm, the numerical value of the parameter has been previously determined. The numerical value of the parameter may be set when the process or the algorithm is begun or during a period in which the process or algorithm is executed in accordance with an embodiment.

The suffixes "module" and "unit" of elements herein are used for convenience of description and thus can be used interchangeably, and do not have any distinguishable meanings or functions.

In the following description of the embodiments of the present disclosure, a detailed description of known functions and configurations incorporated herein have been omitted where it may obscure the subject matter of the embodiments of the present disclosure. In addition, the embodiments of the present disclosure should be more clearly understood from the accompanying drawings, and the technical idea disclosed in the specification is not limited by the accompanying drawings. It is also to be appreciated that all changes, equivalents, and substitutes that do not depart from the spirit and technical scope of the present disclosure are encompassed in the present disclosure.

In the meantime, although terms including an ordinal number, such as first or second, may be used to describe a variety of constituent elements, the constituent elements are not limited to the terms, and the terms are used only for the purpose of discriminating or distinguishing one constituent element from other constituent elements.

In the case where an element is "connected" or "linked" to another element, it should be understood that the element may be directly connected or linked to the other element, or another element may be present therebetween. On the contrary, in the case where an element is "directly connected" or "directly linked" to another element, it should be understood that no other element is present therebetween.

Incidentally, unless clearly used otherwise, singular expressions include a plural meaning.

In this specification, the term "comprising," "including," or the like, is intended to express the existence of the characteristic, the numeral, the step, the operation, the element, the part, or the combination thereof, and does not exclude the inclusion or existence of another characteristic, numeral, step, operation, element, part, or any combination thereof, or any addition thereto.

In addition, the term "unit" or "control unit" used in specific terminology such as a motor control unit (MCU), a hybrid control unit (HCU), or the like is only a term widely used for designation of a controller for controlling a particular function of a vehicle and, as such, does not mean a generic functional unit.

The controller may include a communication device configured to communicate with another controller or a sensor, for control of a function to be performed thereby. The controller may include a memory configured to store an operating system, logic commands, input/output information, etc. The controller may also include at least one processor configured to execute discrimination, calculation, determination, etc. required for control of the function to be performed.

A charging system of an electrified vehicle according to an embodiment of the present disclosure proposes that a first inverter or a second inverter is selectively enabled to perform a boost converter function through inclusion of a switch unit between a switch and each of the first inverter and the second inverter. As such, even when one of the first and second inverters, for example, the first inverter, through which recharging of a battery is performed, fails, recharging of the battery is continued through the other of the first and second inverters, for example, the second inverter.

Hereinafter, a configuration of the charging system according to the embodiment of the present disclosure is described with reference to FIG. 1.

FIG. 1 is a circuit diagram of the charging system according to the embodiment of the present disclosure.

Referring to FIG. 1, the charging system according to the embodiment of the present disclosure may include a battery 100, a motor 200, a first inverter 310, a second inverter 320, a first switch unit 410, a second switch unit 420, a plurality of switches 500, and a controller 600. The charging system may be connected to an external charger 10.

FIG. 1 mainly shows constituent elements associated with description of an embodiment of the present disclosure. The charging system may be practically implemented through inclusion of a greater or smaller number of constituent elements than that of the constituent elements as shown and described. Next, each constituent element is described in more detail below.

The battery 100 may receive DC electric power, to be recharged therewith, or may output DC electric power, for driving a motor. The battery 100 may be implemented through a 400V-grade specification, an 800V-grade specification, or the like.

When the battery 100 is implemented through a 400V-grade specification, the battery 100 may directly receive electric power output from the external charger 10 to be recharged therewith, irrespective of the charging specification of the external charger 10.

On the other hand, when the battery 100 is implemented through an 800V-grade specification, the charging method of the battery 100 may be varied in accordance with the charging specification of the external charger 10.

In this case, the charging method may be classified into a first recharging mode and a second recharging mode. In the first recharging mode, recharging of the battery 100 is performed through external electric power boosted while passing through the motor 200 and the first inverter 310 or the second inverter 320. In the second recharging mode, external electric power for recharging the battery 100 is directly input to the battery 100 without passing through the motor 200 and the first inverter 310 or the second inverter 320.

For example, when the battery 100 is implemented through the 800V-grade specification, and the charging specification of the external charger 10 is a 500V grade, the first recharging mode may be performed. Thus, recharging is performed through external electric power that is boosted while passing through the motor 200 and the first inverter 310 or the second inverter 320, for boosting the charging voltage.

On the other hand, when the battery 100 is implemented through the 800V-grade specification, and the charging specification of the external charger 10 is a 1,000V grade, the second recharging mode may be performed. Thus, external electric power is directly input to the battery 100 without passing through the motor 200 and the first inverter 310 or the second inverter 320, for recharging of the battery 100, because boosting of the input electric power may be omitted.

Meanwhile the motor 200 may have a plurality of coils C1-C3 respectively corresponding to a plurality of phases. The motor 200 may include, for example, three coils respectively corresponding to 3 phases.

The first inverter 310 may include first AC terminals U, V, and W respectively connected to first ends of the plurality of coils C1-C3 and may include first DC terminals D1 and D2 connected to the battery 100. The second inverter 320 may include second AC terminals U', V', and W' respectively connected to second ends of the plurality of coils C1-C3 and may include second DC terminals D1' and D2' connected to the battery 100.

In addition, each of the first inverter 310 and the second inverter 320 may include a plurality of legs, respectively corresponding to the plurality of phases, to form electrical connection thereto. Two switching elements may be connected to each leg in series. Each of the plurality of legs may be connected to a respective one of the plurality of coils C1-C3 having a phase that corresponds thereto.

In embodiments of the present disclosure, electric power input from the external charger 10 may be converted through the first inverter 310 or the second inverter 320 for recharging of the battery 100. Electric power of the battery 100 may be converted through at least one of the first inverter 310 or the second inverter 320 to drive the motor 200.

In more detail, recharging of the battery 100 through the first inverter 310 or the second inverter 320 may be achieved by enabling the first inverter 310 or the second inverter 320 to receive external electric power that is input from the external charger 10 to a neutral point N of the motor 200 at the legs thereof corresponding to respective phases. The electric power is boosted by controlling the switching elements of the respective legs and then the boosted electric power is supplied to the battery 100.

In addition, driving the motor 200 through at least one of the first inverter 310 or the second inverter 320 may be achieved by enabling at least one of the first inverter 310 or the second inverter 320 to convert DC electric power stored in the battery 100 into 3-phase AC electric power. Then, the 3-phase AC electric power is supplied to the motor 200.

Meanwhile, one end of the first switch unit 410 may be selectively connected to the first end or the second end of each of the plurality of coils C1-C3. The other end of the first switch unit 410 may be connected to the plurality of switches 500.

The first switch unit 410 may include a plurality of switches that correspond to respective phases. The plurality of switches of the first switch unit 410 may be embodied as, for example, relays or the like.

One end of each of the plurality of switches 500 may be connected to the other end of the first switch unit 410. Another end of each of the plurality of switches 50 may be inter-shorted to form the neutral point N of the motor 200.

In the case in which the one end of the first switch unit 410 is connected to the second end of each of the plurality of coils C1-C3, the second end of each of the plurality of coils C1-C3 may be electrically connected to the neutral point N of the motor 200 in a turn-on state of the plurality of switches 500. In this manner, the first inverter 310 may be connected to the motor 200. On the other hand, in a turn-off state of the plurality of switches 500, the other end of each of the plurality of coils C1-C3 may be electrically disconnected from the neutral point N of the motor 200. In this manner, both the first inverter 310 and also the second inverter 320 may be connected to the motor 200.

In the case in which the one end of the first switch unit 410 is connected to the first end of each of the plurality of coils C1-C3, the first end of each of the plurality of coils C1-C3 may be electrically connected to the neutral point N of the motor 200 in a turn-on state of the plurality of switches 500. In this manner, the second inverter 320 may be connected to the motor 200. On the other hand, in a turn-off state of the plurality of switches 500, the first end of each of the plurality of coils C1-C3 may be electrically disconnected from the neutral point N of the motor 200. In this manner, both the first inverter 310 and the second inverter 320 may be connected to the motor 200.

In accordance with the provision of the first switch unit 410 as described above, it may be possible to selectively adjust connection of the neutral point N of the motor 200 to the first inverter 310 and the second inverter 320 in the turn-on state of the plurality of switches 500. Thus, the inverter usable for recharging the battery 100 may be selected or changed in accordance with a switching state of the first switch unit 410.

Meanwhile, the switching elements of the first inverter 310 and the second inverter 320, and the plurality of switches 500, may be embodied as various switching elements known in the technical field. For example, the various witching elements may be a metal oxide semiconductor field effect transistor (MOSFET), an insulated gate bipolar transistor (IGBT), or the like. The switching elements of the first inverter 310 and the second inverter 320, and the plurality of switches 500, may be embodied as different kinds of switching elements, respectively.

One end of the second switch unit 420 may be connected to an input terminal 11 for external electric power for battery recharging. The other end of the second switch unit 420 may be selectively connected to the battery 100 or to the other ends of the plurality of switches 500.

In accordance with the provision of the second switch unit 420 as described above, it may be possible to selectively adjust connection of the input terminal 11 for external electric power to the battery 100 and the neutral point N. Thus, external electric power may be transmitted to the battery 100 via at least one of the first inverter 310 or the second inverter 320 and the motor 200, or may be directly transmitted to the battery 100.

In other words, electrical connection relationships respectively corresponding to the first recharging mode and the second recharging mode as described above may be established.

The controller 600 may control a switching state of the first switch unit 410 and may further be configured to perform control for a switching state of the second switch unit 420, pulse width modulation (PWM) control for the first inverter 310 and the second inverter 320, and the like.

In particular, the controller 600 may control a switching state of the first switch unit 410 based on a state of the first inverter 310 when the battery 100 is recharged with external electric power input through the neutral point N.

When the first inverter 310 is a normal state, the controller 600 may control a switching state of the first switch unit 410 in order to control the one end of the first switch unit 410 to be connected, to the second end of each of the plurality of coils C1-C3. In this case, the first inverter 310 functions as a boost converter and, as such, the battery 100 is recharged with electric power boosted through the first inverter 310.

In other words, when the first inverter 310 is in a normal state, the first inverter 310 may be used in recharging the battery 100. Accordingly, the first inverter 310 may be implemented to have a higher charging efficiency than that of the second inverter 320. Of course, this is one implementation example, and the present disclosure is not limited thereto.

On the other hand, when the first inverter 310 is in a failed state, the controller 600 may control a switching state of the first switch unit 410 in order to control the one end of the first switch unit 410 to be connected to first end of each of the plurality of coils C1-C3. In this case, the second inverter 320 functions as a boost converter and, as such, the battery 100 is recharged with electric power boosted through the second inverter 320.

In other words, when the first inverter 310 is in a failed state, the second inverter 320 may be used in recharging the battery 100. As such, the battery 100 may be recharged even when the first inverter 310 fails.

Here, the failed state of the first inverter 310 may include at least one of an abnormality of a current sensing value of the first inverter 310 or an excessive temperature of the first inverter 310. In addition, the failure state of the first inverter 310 may further include a case in which charging the battery 100 through the first inverter 310 cannot be performed normally due to an overcurrent of the plurality of switches 500.

In more detail, an abnormality of a current sensing value of the first inverter 310 may be determined based on currents of the first AC terminals U, V, and W and a battery input current Ibat. Also, the overcurrent of the plurality of switches 500 may be determined based on the battery input current and the current specification of the plurality of switches.

For example, the abnormality of a current sensing value of the first inverter 310 may include the case in which a sum of the currents of the first AC terminals U, V, and W is not equal to the battery input current Ibat.

For example, overcurrent of the plurality of switches 500 may include the case in which the battery input current Ibat exceeds the current specification of the plurality of switches.

In order to determine the failed state as described above, a current sensor and a temperature sensor may be provided at multiple points of a connection circuit of the battery 100, the first inverter 310, the second inverter 320, and the like. In this case, the controller 600 may determine states of the first inverter 310 and the second inverter 320 based on a sensing value of each sensor.

In more detail, the current sensor may be provided between respective legs of the first inverter 310 and the second inverter 320 and the coils C1-C3 corresponding thereto. The current sensor may be implemented to sense a current of each of the first AC terminals U, V, and W and the second AC terminals U', V', and W'. The current sensor may also be provided between each of the first DC terminals D1 and D2 and the second DC terminals D1' and D2' and the battery 100. The current sensor may be implemented to sense the battery input current Ibat. In addition, the current sensor may be provided at various other points in accordance with currents to be sensed.

The temperature sensor may be provided at each switching element of the first inverter 310 and, as such, may sense a junction temperature of the first inverter 310. The temperature sensor may also be provided at each switching element of the second inverter 320 and, as such, may sensor a junction temperature of the second inverter 320.

Meanwhile, in addition to the current sensor and the temperature sensor, a voltage sensor may be provided at the connection circuit of the battery 100, the first inverter 310, the second inverter 320, etc. according to embodiments of the present disclosure. For example, the voltage sensor may be provided between the battery 100 and each of the input terminals 11 and 12 for external electric power and the first DC terminals D1 and D2.

Meanwhile, similar to the failed state of the first inverter 310, the failed state of the second inverter 320 may include at least one of an abnormality of a current sensing value of the second inverter 320 or an excessive temperature of the second inverter 320. Also, the failure state of the second inverter 320 may further include a case in which charging the battery 100 through the second inverter 320 cannot be performed normally due to overcurrent of the plurality of switches 500.

In addition, when the first inverter 310 is in a failed state, the controller 600 may control a switching state of the first switch unit 410 after stopping driving of the first inverter 310.

For example, the controller 600 may stop driving of the first inverter 310 by blocking a gate voltage applied to the first inverter 310.

In addition, when the first inverter 310 is in a failed state, the controller 600 may control a switching state of the first switch unit 410 after starting driving of the second inverter 320.

For example, the controller 600 may start driving of the second inverter 320 by applying a gate voltage to the second inverter 320.

Meanwhile, the controller 600 may control recharging of the battery 100 based on a state of the second inverter 320 in a state in which the one end of the first switch unit 410 is connected to the first end of each of the plurality of coils C1-C3.

For example, when the second inverter 320 is in a failed state, the controller 600 may end recharging of the battery 100. For this, the controller 600 may output an output current command for the external charger 10, stopping of driving of the second inverter 320, and the like.

Meanwhile, the controller 600 may control a switching state of the first switch 410 based on a state of the first inverter 310 when the other end of the second switch unit 420 is connected to the other ends of the plurality of switches 500.

When the other end of the second switch unit 420 is connected to the neutral point N, external electric power may be transmitted to the neutral point N. Thus, external electric power may be transmitted to the battery 100 via the first inverter 310 or the second inverter 320.

In other words, when the first recharging mode is performed, the controller 600 may control a switching state of the first switch unit 410 based on a state of the first inverter 310.

In addition, the controller 600 may control a switching state of the second switch unit 420 based on a voltage command for external electric power. In this case, the voltage command for external electric power may be obtained from the external charger 10 or a controller thereof or may be obtained from a separate controller provided in the vehicle.

In more detail, the controller 600 may control a switching state of the second switch unit 420 based on whether or not a voltage value according to the voltage command for external electric power exceeds a predetermined voltage value. In this case, the predetermined voltage value may be set by taking into consideration, i.e. based on, the voltage specification of the battery 100.

For example, when the voltage value according to the voltage command for external electric power exceeds the predetermined voltage value, the controller 600 may control a switching state of the second switch unit 420 such that the other end of the second switch unit 420 is connected to the other ends of the plurality of switches 500. In addition, when the voltage value according to the voltage command for external electric power does not exceed the predetermined voltage value, the controller 600 may control a switching state of the second switch unit 420 such that the other end of the second switch unit 420 is connected to the battery 100.

Meanwhile, the controller 600 may output information corresponding to a state of at least one of the first inverter 310 or the second inverter 320. The charging system according to the embodiment of the present disclosure may further include a display unit 700 configured to represent information output from the controller 600 in at least one of a visual manner or an audible manner.

For example, the display unit 700 may be embodied as an audio, video, and navigation (AVN) device, a display device such as a cluster or the like, a voice guidance device, or the like provided in the vehicle.

Hereinafter, implementation examples of the controller 600 applicable to embodiments of the present disclosure are described with reference to FIG. 2.

Figure 2:
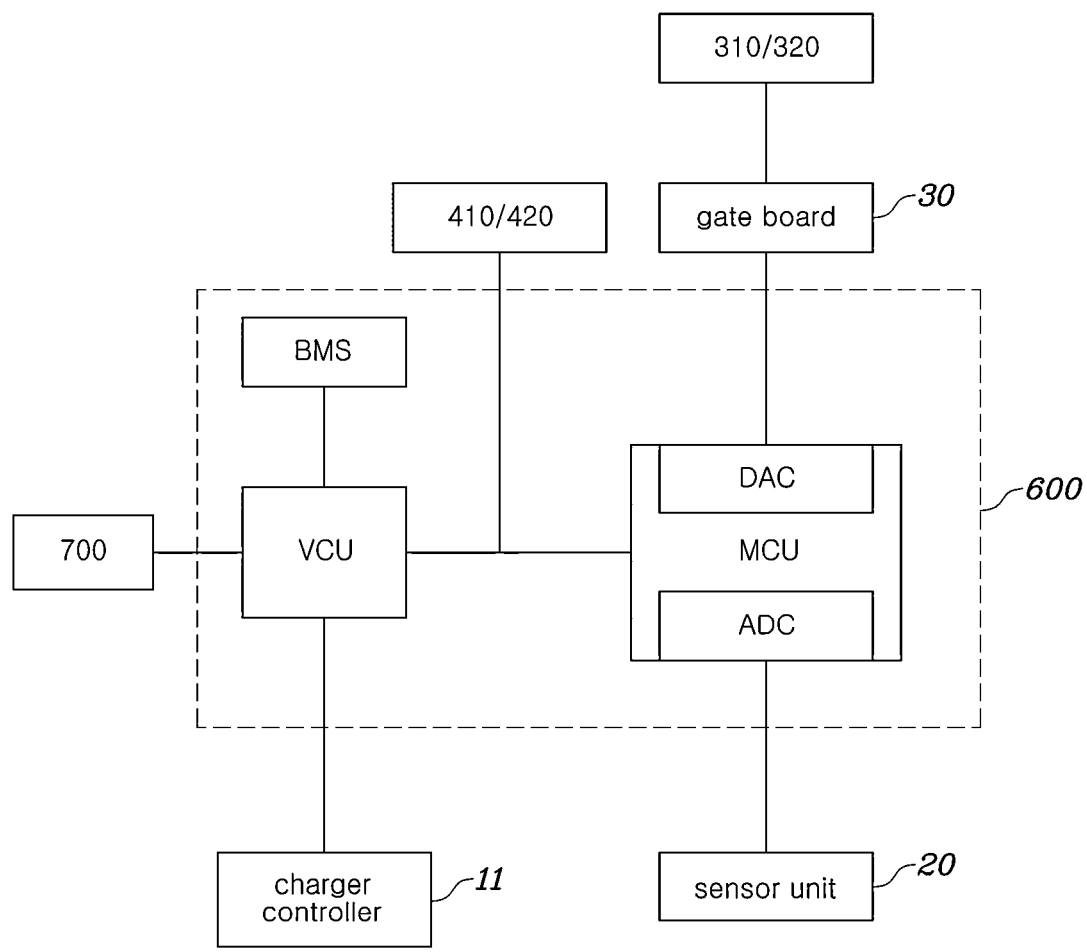
FIG. 2 is a diagram showing a configuration of the controller applicable to embodiments of the present disclosure.

FIG. 2 is a diagram showing a configuration of the controller applicable to embodiments of the present disclosure.

Referring to FIG. 2, the controller 600 applicable to embodiments of the present disclosure may be implemented through inclusion of a battery management system (BMS), a vehicle control unit (VCU), and a motor control unit (MCU). In addition, the controller 600 may be connected to a charger controller 11 of the external charger 10, a sensor unit 20 including a voltage sensor, a temperature sensor, a current sensor, a gate board 30, and the like.

The BMS may provide information as to a voltage, a current, and the like of a battery to the VCU. The VCU may provide the information as to the voltage, the current, and the like of the battery to the MCU. The MCU may apply a gate signal to the first inverter 310 and the second inverter 320 via the gate board 30 based on a sensing value received from the sensor unit 20 together with the information as to the voltage, the current, and the like of the battery.

The MCU may include an analog-to-digital converter (ADC) configured to convert an analog signal into a digital signal and a digital-to-analog converter (DAC) configured to convert a digital signal into an analog signal. The MCU may convert an input analog value into a digital value, to output the digital value, or may convert an input digital value into an analog value, to output the analog value.

In addition, the VCU may transmit a current command to the charger controller 11 or may receive a charger voltage command from the MCU. The VCU may also receive state information of the first inverter 310 and the second inverter 320 based on the sensing value from the MCU.

The VCU may transmit a control command for controlling a switching state of the first switch unit 410 based on a state of the first inverter 310 or may transmit a control command for controlling gate signal application of the MCU based on states of the first inverter 310 and the second inverter 320.

Although implementation examples of the controller 600 applicable to embodiments of the present disclosure have been described, implementation of the controller 600 is not limited thereto. For example, the controller 600 may be implemented in various forms, for example, using only the VCU or using a separate controller.

Hereinafter, charging methods for the charging system according to embodiments of the present disclosure are described with reference to FIGS. 3-5.

Figure 3:
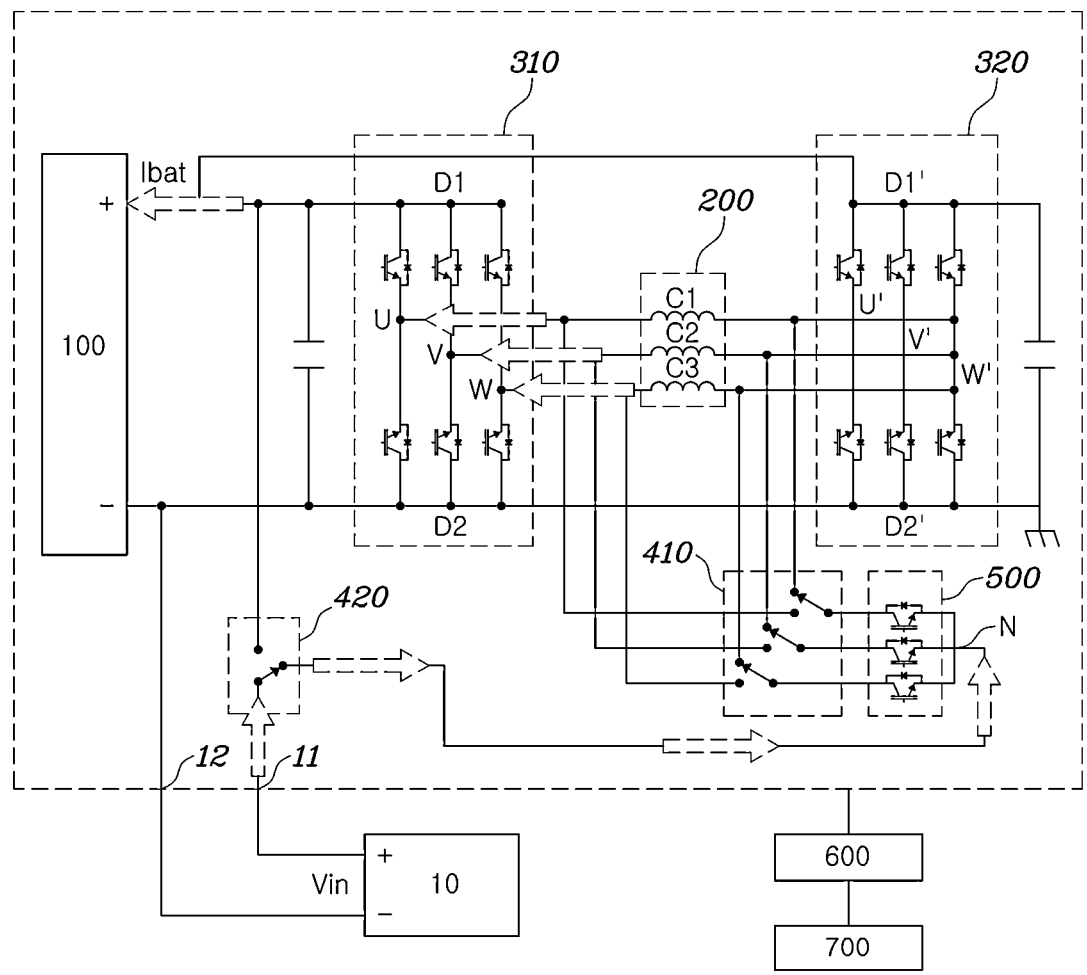
FIG. 3 is a circuit diagram explaining a procedure in which a first recharging mode is performed in a normal state of a first inverter in the charging system according to an embodiment of the present disclosure.

FIG. 3 is a circuit diagram explaining a procedure in which the first recharging mode is performed in a normal state of the first inverter 310 in the charging system according to the embodiment of the present disclosure.

Referring to FIG. 3, in the first recharging mode, the second switch unit 420 interconnects the external electric power input terminal 11 and the neutral point N. Thus, external electric power is transmitted to the neutral point N.

When the first inverter 310 is in a normal state, the controller 600 controls a switching state of the first switch unit 410 such that the first switch unit 410 interconnects the second end of each of the plurality of coils C1-C3 and the neutral point N. Accordingly, external electric power is transmitted to the battery 100 after being boosted through the plurality of coils C1-C3 and the first inverter 310. As a result, recharging is carried out.

Figure 4:
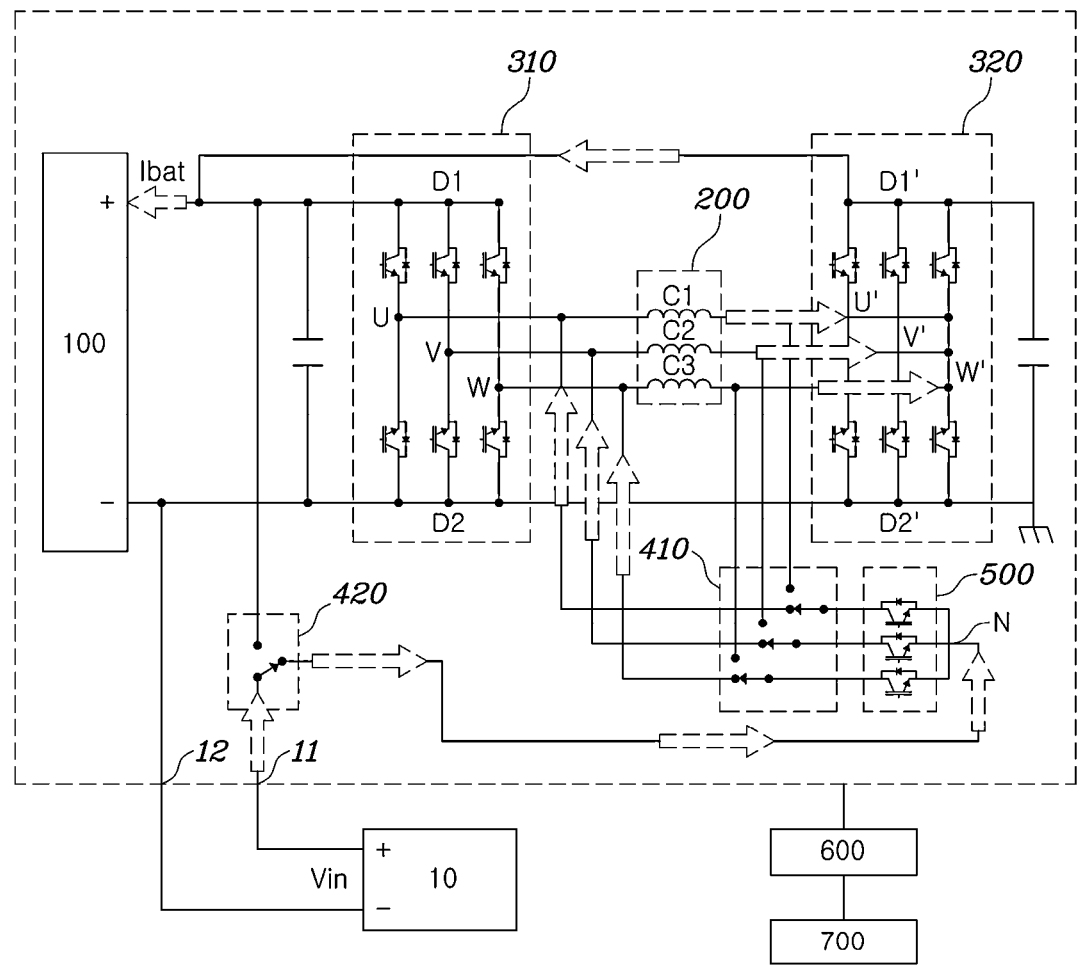
FIG. 4 is a circuit diagram explaining a procedure in which the first recharging mode is performed in a failed state of the first inverter in the charging system according to the embodiment of the present disclosure.

FIG. 4 is a circuit diagram explaining a procedure in which the first recharging mode is performed in a failed state of the first inverter 310 in the charging system according to an embodiment of the present disclosure.

Referring to FIG. 4, in the first recharging mode, the second switch unit 420 interconnects the external electric power input terminal 11 and the neutral point N. Thus, external electric power is transmitted to the neutral point N.

When the first inverter 310 is in a failed state, the controller 600 controls a switching state of the first switch unit 410 such that the first switch unit 410 interconnects the first end of each of the plurality of coils C1-C3 and the neutral point N. Accordingly, external electric power is transmitted to the battery 100 after being boosted through the plurality of coils C1-C3 and the second inverter 320. As a result, recharging is carried out.

Figure 5:
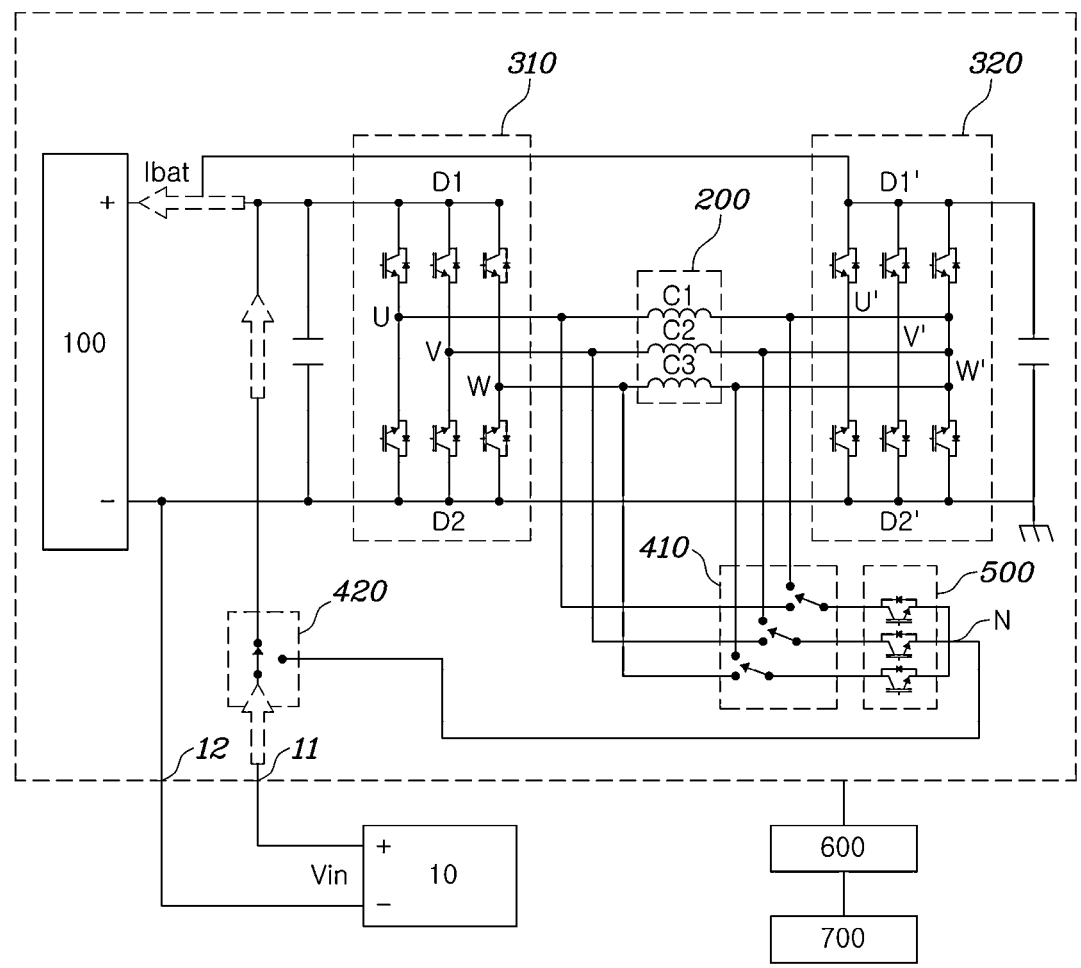
FIG. 5 is a circuit diagram explaining a procedure in which a second recharging mode is performed in the charging system according to the embodiment of the present disclosure.

FIG. 5 is a circuit diagram explaining a procedure in which the second recharging mode is performed in the charging system according to an embodiment of the present disclosure.

Referring to FIG. 5, in the second recharging mode, the second switch unit 420 directly interconnects the external electric power input terminal 11 and the battery 100. External electric power is thus directly transmitted to the battery 100 without being transmitted to the neutral point N.

In accordance with various embodiments of the present disclosure as described above, even when one inverter performing a booster converter function fails during recharging of a battery in an electrified vehicle, recharging of the battery may be continued through another inverter without being immediately stopped.

As information regarding a failed state of an inverter is provided, a vehicle driver or other user may recognize the state of the inverter and, as a result, may take an appropriate action.

Figure 6:
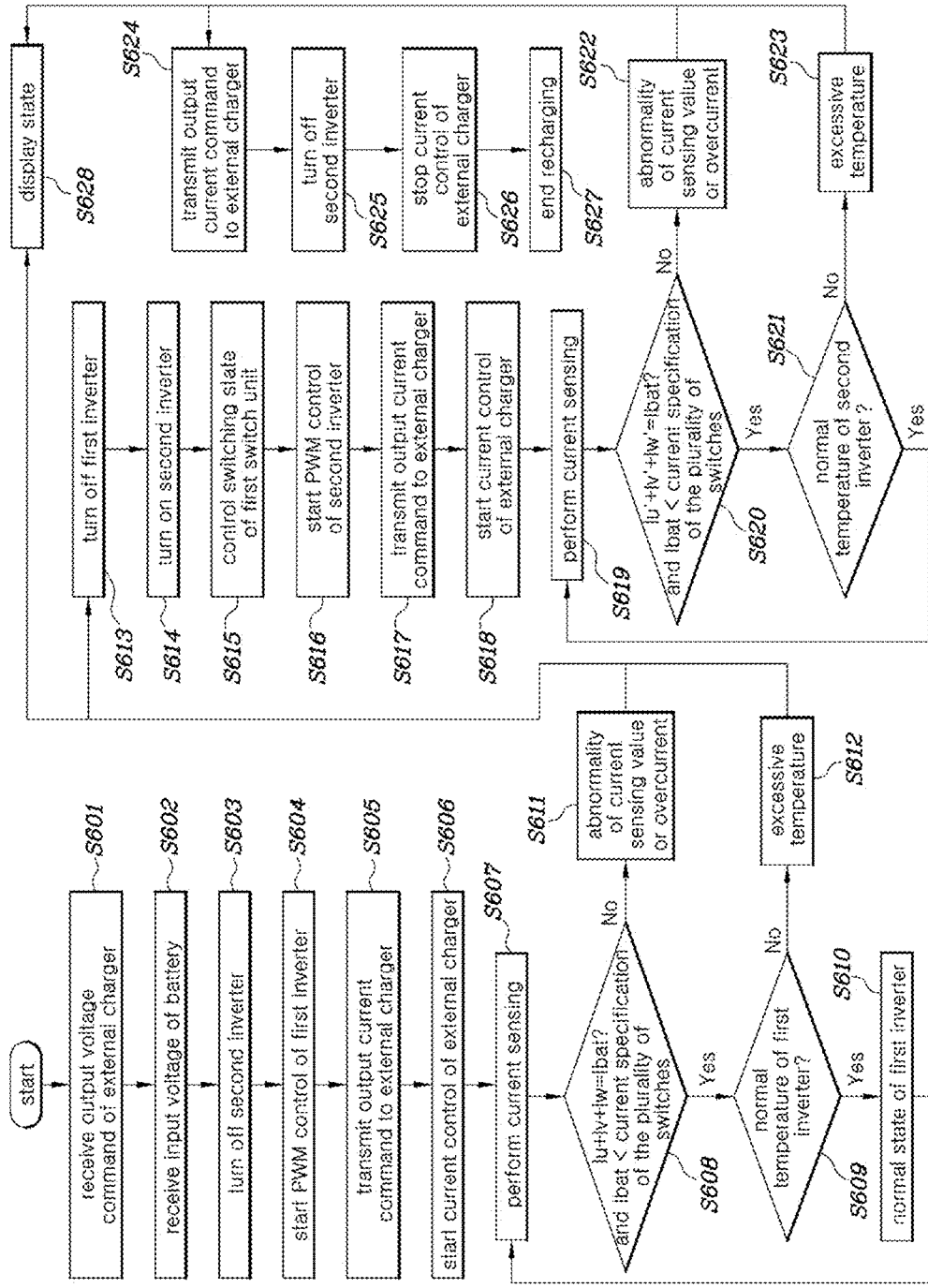
FIG. 6 is a flowchart explaining a charging procedure through the charging system according to the embodiment of the present disclosure.

FIG. 6 is a flowchart explaining a charging procedure through the charging system according to an embodiment of the present disclosure.

Referring to FIG. 6, the controller 600 first receives an output voltage command of the external charger 10 and an input voltage of the battery 100 (S601 and S602). Then the controller 600 turns off the second inverter 320 (S603) while starting PWM control of the first inverter 310 (S604) in order to start recharging of the battery 100.

Thereafter, the controller 600 transmits an output current command to the external charger 10 (S605). The external charger 10, which receives the output current command, then starts current control (S606). As a result, recharging of the battery 100 is performed.

The controller 600 senses the currents of respective phases and a battery input current in the recharging procedure of the battery 100 (S607). The controller 600 then determines whether or not a sum of the currents of respective phases is equal to the battery input current. The controller 600 then determines whether or not the battery input current Ibat is under the current specification of plurality of switches (S608) and determines whether or not a temperature of the first inverter 310 is in a normal range (S609).

When the sum of the currents of respective phases (Iu+Iv+Iw) is equal to the battery input current Ibat (Iu+Iv+Iw=Ibat), the battery input current Ibat is under the current specification of plurality of switches, and the temperature of the first inverter 310 is in the normal range, the controller 600 determines that the first inverter 310 is in a normal state (S610). The controller 600 then controls the one end of the first switch unit 410 to be connected to the second end of each of the plurality of coils, thereby enabling recharging of the battery 100 through the first inverter 310.

On the other hand, when the sum of the currents of respective phases (Iu+Iv+Iw) is not equal to the battery input current Ibat (Iu+Iv+Iw≠Ibat) or the battery input current Ibat is not under the specification of plurality of switches (NO in S608), and the temperature of the first inverter 310 is not in the normal range (NO in S609), the controller 600 may determine that the first inverter 310 is in a failed state due to an abnormality of a current sensing value or overcurrent (S611) or an excessive temperature (S612).

In this case (S611 or S612), the controller 600 may turn off the first inverter 310, may turn on the second inverter 320, and may then control a switching state of the first switch unit 410. The switching state of the first switch unit 410 may be controlled such that the one end of the first switch unit 410 is connected to the first end of each of the plurality of coils (S615), in order to enable recharging of the battery 100 through the second inverter 320.

After completing the preparation as described above, the controller 600 starts PWM control of the second inverter 320 (S616), and again transmits an output current command to the external charger 10 (S617). The external charger 10, which receives the new output current command, then starts current control in accordance with the new output current command (S618). Then recharging of the battery 100 is performed through the second inverter 320.

Similar to the above-described procedure, in the recharging procedure through the second inverter 320, the controller 600 senses the currents of respective phases and an battery input current (S619). The controller 600 then determines whether or not a sum of the currents of respective phases is equal to the battery input current Ibat and the battery input current Ibat is under the specification of the plurality of switches (S620). 600 determines whether or not a temperature of the second inverter 320 is in a normal range (S621).

When the sum of the currents of respective phases (Iu'+Iv'+Iw') is equal to the sensed battery input current Ibat (Iu'+Iv'+Iw'=Ibat), the battery input current Ibat is under the specification of the plurality of switches, and the temperature of the second inverter 320 is in the normal range, the controller 600 determines that the second inverter 320 is in a normal state (S620 and S621). The controller 600 then performs control for continuous recharging of the battery 100 through the second inverter 320 in the state in which the one end of the first switch unit 410 is connected to the first end of each of the plurality of coils C1-C3.

On the other hand, when the sum of the currents of respective phases (Iu'+Iv'+Iw') is not equal to the sensed battery input current Ibat (Iu'+Iv'+Iw'≠Ibat) or the battery input current (Ibat) is not under the specification of the plurality of switches (NO in S620), and the temperature of the second inverter 320 or is not in the normal range (NO in S621), the controller 600 may determine that the second inverter 320 is in a failed state due to the abnormality of a current sensing value or overcurrent (S622) or an excessive temperature (S623).

When the second inverter 320 is in a failed state (S622 and S623), it is impossible to normally recharge the battery 100 through the first inverter 310 and the second inverter 320. In this case, accordingly, the controller 600 transmits an output current command to the external charger 10 (S624) and turns off the second inverter 320 (S625). The external charger 10 also stops current control in accordance with the output current command received thereby (S626). As a result, recharging is ended.

On the other hand, when both the first inverter 310 and the second inverter 320 are in a failed state (S611, S612, S622, and S623), the controller 600 may output information corresponding to the states of the first inverter 310 and the second inverter 320. The display unit 700, which obtains the information, may represent the states of the first inverter 310 and the second inverter 320 in a visual and/audible manner in order to enable a vehicle driver or other user to recognize a change of a recharging mode, whether or not recharging is stopped, a reason therefor, and the like.

In accordance with various embodiments of the present disclosure as described above, even when one inverter that is performing a booster converter function fails during recharging of a battery in an electrified vehicle, recharging of the battery may be continued through another inverter without being immediately stopped.

As information regarding a failed state of an inverter is provided, a vehicle driver or other user may recognize the state of the inverter and, as such, may take an appropriate action.

Effects attainable according to the present disclosure are not limited to the above-described effects. Other effects of the present disclosure not yet described should be more clearly understood by those of ordinary skill in the art from the appended claims.

Although embodiments of the present disclosure have been described in detail with reference to the accompanying drawings, the present disclosure is not limited to the disclosed embodiments. Various changes may be made in the embodiments without departing from the principles and spirit of the disclosure. Therefore, the disclosed embodiments are to be considered in all respects as illustrative and not restrictive. The scope of the disclosure is indicated by the appended claims rather than the foregoing description. All changes that come within the meaning and range of equivalency of the disclosure are intended to be embraced therein.

What is claimed is:

1. A charging system for an electrified vehicle, the charging system comprising:
    a battery configured to receive or output DC electric power;
    a motor having a plurality of coils respectively corresponding to a plurality of phases;
    a first inverter having first AC terminals respectively connected to a first end of each of the plurality of coils and having first DC terminals connected to the battery;
    a second inverter having second AC terminals respectively connected to a second end of each of the plurality of coils and having second DC terminals connected to the battery;
    a first switch unit having one end selectively connected to the first ends or the second ends of the plurality of coils;
    a plurality of switches each having one end connected to another end of the first switch unit and each having another end that is inter-shorted to form a neutral point of the motor; and
    a controller configured to control a switching state of the first switch unit.

2. The charging system according to claim 1, wherein the controller controls the switching state of the first switch unit based on a state of the first inverter when the battery is recharged with external electric power input through the neutral point.

3. The charging system according to claim 2, wherein, when the first inverter is in a normal state, the controller controls the switching state of the first switch unit such that the one end of the first switch unit is connected to the second ends of the plurality of coils.

4. The charging system according to claim 2, wherein, when the first inverter is in a failed state, the controller controls the switching state of the first switch unit such that the one end of the first switch unit is connected to the first ends of the plurality of coils.

5. The charging system according to claim 4, wherein the failed state of the first inverter comprises at least one of an abnormality of a current sensing value of the first inverter or an excessive temperature of the first inverter.

6. The charging system according to claim 5, wherein the abnormality of the current sensing value of the first inverter is determined based on a current of each of the first AC terminals and a battery input current.

7. The charging system according to claim 4, wherein, when the first inverter is in a failed state, the controller controls the switching state of the first switch unit after stopping driving of the first inverter.

8. The charging system according to claim 4, wherein, when the first inverter is in a failed state, the controller controls the switching state of the first switch unit after starting driving of the second inverter.

9. The charging system according to claim 4, wherein the controller controls recharging of the battery based on a state of the second inverter under a condition that the one end of the first switch unit is connected to the first ends of the plurality of coils.

10. The charging system according to claim 9, wherein, when the second inverter is in a failed state, the controller ends recharging of the battery.

11. The charging system according to claim 1, further comprising:
    a second switch unit having one end connected to an input terminal for external electric power for recharging of the battery and having another end selectively connected to the battery or the other ends of the plurality of switches.

12. The charging system according to claim 11, wherein, when the other end of the second switch unit is connected to the other ends of the plurality of switches, the controller controls the switching state of the first switch unit based on a state of the first inverter.

13. The charging system according to claim 11, wherein the controller controls a switching state of the second switch unit based on a voltage command for the external electric power.

14. The charging system according to claim 13, wherein the controller controls the switching state of the second switch unit based on whether or not a voltage value according to the voltage command exceeds a predetermined voltage value that is set based on a voltage specification of the battery.

15. The charging system according to claim 14, wherein, when the voltage value according to the voltage command exceeds the predetermined voltage value, the controller controls the switching state of the second switch unit such that the other end of the second switch unit is connected to the other ends of the plurality of switches.

16. The charging system according to claim 14, wherein, when the voltage value according to the voltage command does not exceed the predetermined voltage value, the controller controls the switching state of the second switch unit such that the other end of the second switch unit is connected to the battery.

17. The charging system according to claim 1, wherein the controller outputs information corresponding to a state of at least one of the first inverter or the second inverter.

18. The charging system according to claim 17, further comprising:
   a display unit configured to represent the output information in at least one of a visual manner or an audible manner.

* * * * *